Patented May 25, 1943

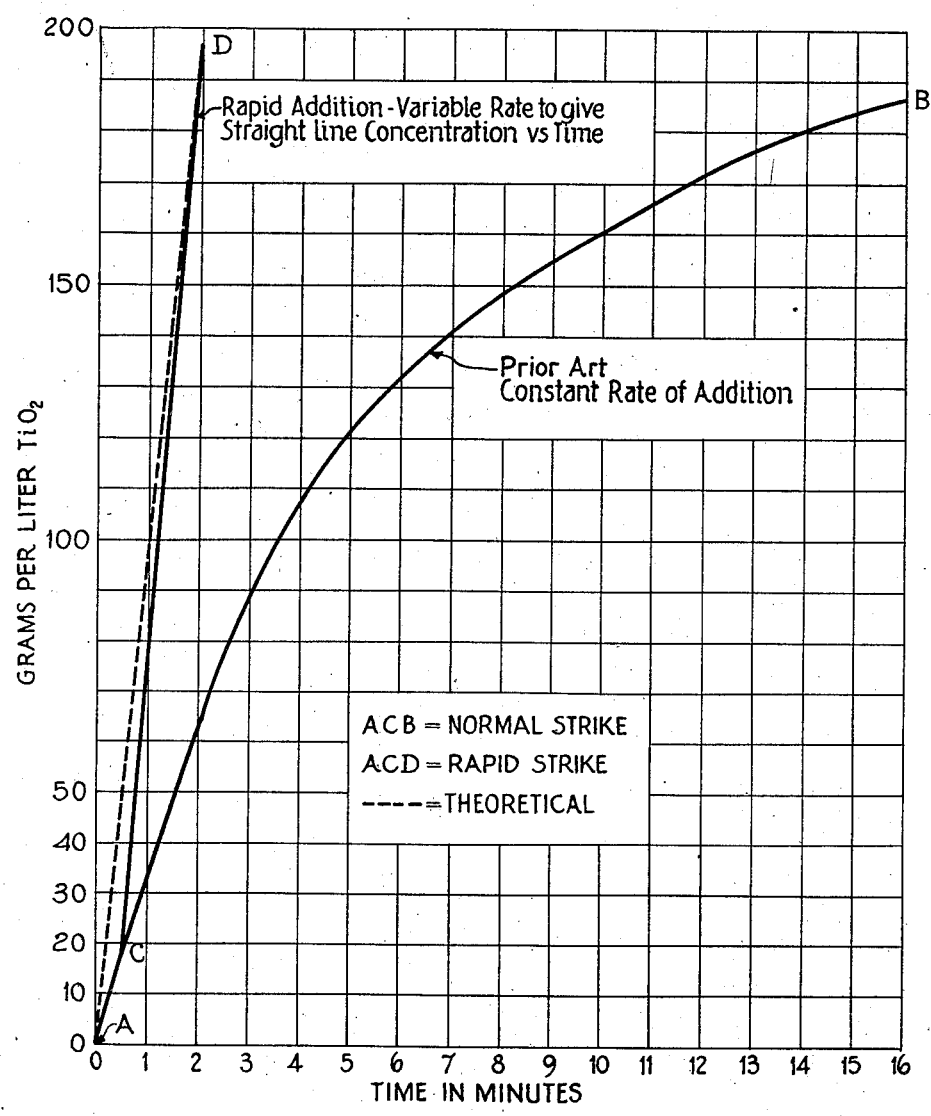

2,319,824

UNITED STATES PATENT OFFICE 2,319,824

TITANIUM OXIDE PRODUCTION

Carl M. Olson, Wilmington, Del., assignor to E. I. du Pont de Nemours & Company, Wilmington, Del., a corporation of Delaware Application July 18, 1939, Serial No. 285,133

6 Claims. (Cl. 23—202)

This invention relates to the production of pigment-useful titanium compounds and to improved processes for manufacturing the same. More particularly, it relates to improvements in processes for producing pigment titanium oxide from hydrolyzable acid solutions of titanium.

In a more specific sense, the invention relates to improvements in processes for accelerating the hydrolysis of titanium salt solutions and particularly titanium sulfate, in order to obtain increased, high yields of titanium oxide in relatively pure condition, whereby ultimate procurance is had of a titanium oxide pigment of controlled, substantially uniform particle size which exhibits excellent color, texture, strength and opacity.

In the production of hydrated titanium oxide, useful for pigment purposes, acid solutions of titanium are hydrolyzed at elevated temperatures, these solutions being usually obtained from mineral acid (sulfuric, hydrochloric, etc.) attack upon titaniferous ores (ilmenite, rutile, brookite, etc.). Metals other than titanium which dissolve during such processing are removed from the hydrolysis precipitate by filtration and washing. Upon further purification and after subjection to calcination, said precipitate yields a finely-divided, white titanium oxide pigment adapted for many well-known uses. The brightness of the final product is, in general, proportional to the concentration of the titanium solution at the time of hydrolysis. Besides requisite brightness and possession of a relatively pure neutral tint, said pigment must meet other specifications, particularly in respect to particle size, texture, color and opacity. The number and size of the ultimate pigment particles is determined, in a large measure, by the number of colloidal nuclei used to accelerate the hydrolysis reaction.

In large scale commercial titanium oxide pigment production, concentrated rather than relatively dilute titanium solutions are preferably and more advantageously employed. Not only is it more desirable and economical to use such solutions, but the pigment obtained therefrom exhibits better color and greater hiding power than does a product obtained from dilute solutions. When a solution of the latter type is employed, it is usually concentrated by evaporation or otherwise, prior to hydrolysis. Concentrated solutions, however, fail to hydrolyze readily and resort to catalytic hydrolysis or seeding agents is therefore had. Since control of particle size is of the utmost importance in the procurance of maximum pigment opacity, the hydrolysis catalyst so employed must act not only as an accelerator but as a nucleating agent as well.

In Blumenfeld U. S. Reissue Patent No. 18,854 useful methods for accelerating the decomposition of titanium salt solutions through the initial formation in the hydrolyzing liquor of colloidal titanium hydrate are disclosed. Such colloidal nuclei are formed by slowly and uniformly adding the titanium solution to boiling water. Unless, according to the patentee, such slow rate of addition is observed, an inadequate colloidal phase results, and, as a consequence, the yields of titanium oxide decrease and incomplete hydrolysis occurs. Also, in such processes, the titanium solutions used must be adjusted to certain acidity and then introduced in accordance with a complicated procedure. Unless exact observance of the reacting conditions is strictly followed, an objectionable loss in yield or production of an unfilterable colloid, or both, results. Often deviations occur from such established conditions in large scale plant operations, and production of an undesirable, non-uniform hydrolysis product therefore results. Furthermore, such prior processes do not readily enable one to maintain a satisfactorily complete and accurate control over nucleation. This is a very important factor, because formation and dispersion of nuclei not only directly affect acceleration of the precipitation reaction, but the ultimate character and particle size of the pigment titanium oxide as well.

In U. S. Reissue Patent 18,790 to Mecklenburg, titnium hydrate nuclei useful in hydrolysis procedures result by combining sufficient neutralizing agent (such as an alkali hydroxide) with a titanium salt solution as will reduce the hydrogen ion concentration of the solution to a point within an acidic pH range, maintenance of certain temperature conditions being thereupon had. From the ensuing reaction a seed suspension of precipitated titanium hydroxide within the alkali sulfate solution is obtained. While affording many desirable advantages, use of caustic or acid-binding agents is required in such type of procedure. This is disadvantageous not only from an economical standpoint and the costs incidental to their use, but such alkali reagents induce formation of objectionable alkali or alkali earth compounds in the precipitated titanium hydrate. The presence of these compounds in the precipitate is deleterious, due to the fact that highly colored rare earth metal impurities form in the hydrate and as a result an off-color pigment is obtained. Again, if any iron is present in the solution, it also precipitates, and an additional redissolving step is therefore required to offset the contaminating effects which iron presence in the pigment would otherwise induce.

I have found that these and other disadvantages existing in prior procedures for accelerating the hydrolysis of titanium salt solutions can be effectively overcome, and it is accordingly among the objects of my invention to provide a novel method for affording such results. It is among the particular objects of my invention to provide a novel method for preparing an especially effective and highly useful type of nuclei or seeding material useful in titanium liquor hydrolyses and which functions therein both as an accelerator and nucleating agent. Additional objects include the provision of a novel method of hydrolyzing titanium solutions, whereby hydrolysis of such solutions to substantial completion is quickly effected and without requiring long hours of boiling; to provide a process from which the yields of titanium oxide are substantially in excess of 95%, and one in which ready and effective control is afforded over the particle size and other requisite pigment characteristics of the titanium oxide produced. Other objects include: the provision of an efficient method for producing relatively pure pigment titanium oxide of satisfactory texture and controlled uniform particle size characteristics, said pigment exhibiting high hiding power, excellent color, opacity and desired undertone properties.

These and other objects are attainable in my invention which embodies the discovery that in nucleating or seeding a titanium salt solution which is to be hydrolyzed, the first few (substantially 30) seconds are by far the most critical in the entire hydrolysis period, and that when the hydrated colloidal nuclei used in such seeding are quickly formed in or admixed with the hydrolyzing liquor, e. g., within a period not exceeding substantially 2 minutes' time, adequate and efficient control over nucleation and subsequent hydrolysis becomes unexpectedly and advantageously effected.

My further discovery is that by use of the herein disclosed novel method for nucleating a hydrolyzable titanium solution, advantageously a greater number of nuclei are caused to be more quickly formed in and uniformly dispersed throughout said solution, whereby relatively small titanium hydrate particles of more uniform radius are caused to be precipitated on hydrolysis, which hydrate, after being calcined, yields a titanium oxide pigment of controlled, uniform and desired small particle size which exhibits excellent texture and color characteristics, as well as satisfactory opacity and hiding power.

In one broad adaptation, the invention comprises quickly mixing, within a total time period not to exceed substantially two minutes, a known volume of a diluent with a known volume of a hydrolyzable titanium solution, and utilizing such conditions of liquor temperature and concentration that a known quantity of precipitated titanium hydrate nuclei becomes substantially immediately and completely dispersed as a hydrolysis seeding agent in said titanium solution.

In a more specific and preferred embodiment, the invention comprises initially rapidly mixing (within substantially 30 seconds' time) a definite portion of a known but relatively small volume of hot titanium salt solution with a known but relatively large volume of hot diluent, such as water, and thereafter without permitting any interruption in the mixing operation, combining the remaining portion of said titanium solution with the diluent at a rate which is of progressively increasing character, whereby upon the lapse of a total time period not exceeding substantially 2 minutes from commencement of admixture, the complete combination of said liquors with each other is effected.

The invention will be found usefully adaptable in the hydrolysis of all types of titanium salt solutions, e. g., the sulfate, chloride, etc., and whether the character of said solutions are relatively dilute (containing not in excess of substantially 200 grams $TiO_2$ per liter and usually from 180–200 g./l.) or relatively concentrated (containing in excess of substantially 200 grams $TiO_2$ per liter and usually within, say, from 225 to 260 g./l.). In description, I shall refer to one preferred embodiment involving the use of a relatively concentrated titanium sulfate solution containing sulfuric acid in sufficient excess to react with all the titanium present to provide a hydrolyzable solution having the requisite wellknown "free acidity factor," e. g., from 0 to 100 F. A. Conveniently, said admixture is preferably effected, accompanied by agitation or stirring, through addition of a relatively large but known volume of the titanium sulfate solution to a relatively small but likewise known volume of a diluent, such as water, said titanium solution and diluent being maintained at a temperature of substantially 90° C. The volume ratios which I preferably employ comprise substantially 1 volume of diluent to substantially each 3 volumes of titanium sulfate solution. Such admixture is effected relatively rapidly, in a controlled, regulated manner and within, as stated, certain critical periods of time. Thus, during substantially the critical first 30 seconds, about 2 to 5%, and preferably about 3%, of the total titanium solution to be hydrolyzed is rapidly added and at a relatively uniform, constant rate to the diluent. At the conclusion of such initial addition, but without any interruption in the mixing operation, the rate of addition of the remaining titanium solution is caused to be progressively and continually increased until on expiration of two minutes' time from the inception of the initial titanium liquor addition, the entire volume of said titanium solution is completely incorporated in said diluent. Upon conclusion of titanium solution addition, the temperature of the resultant mixture is caused to be gradually raised to the boiling point, there maintained for a relatively short period of time and until hydrolysis is effected. The product from such hydrolysis, comprising precipitated, relatively pure titanium hydrate, is removed through decantation or otherwise from the mother liquor, filtered and washed to effect acid removal and then dried. The recovered crude pigment product is then subjected to conventional calcination, such as in a rotary calciner, at temperatures in excess of substantially 850° C. and preferably within the range of, say, from about 950 to 1000° C. The calcined produced may then be conventionally dry or wet ground to be made ready for use, the finished product consisting of titanium oxide in a very high state of purity, the particle size of which will be found to be relatively small and desirably uniform. In addition, the finished titanium oxide pigment will exhibit excellent texture, color and whiteness characteristics, as well as possess high tinting strength, hiding power and opacity.

To a more complete understanding of the invention, the following illustrative examples are given, none of which are to be considered as in limitation of the invention:

Example I

A solution of titanium sulfate was obtained by attacking ilmenite ore with sulfuric acid. Iron in the trivalent state was reduced by addition of scrap iron. A portion of the dissolved iron was removed by crystallization, after which the titanium solution was clarified and concentrated to produce a liquor having the following analysis:

|  | Gram-liters |
|---|---|
| $TiO_2$ | 251 |
| Fe | 75 |
| $H_2SO_4$ (total) | 653 |
| Titanium$^{+++}$ | 1.0 |

13 liters of this solution were heated to 97° C. immediately before the hydrolysis step. 4.57 liters of water were heated to 91° C. in a separate vessel equipped with steam coils and an agitator. The titanium solution was added to the water at a rate of 800 cc./min. for the first 30 seconds, after which time the rate was continually increased so that the remaining liquor was added within 1½ minutes. The total time required for effecting such introduction was thus 2 minutes. The temperature of the resultant solution was then slowly raised to the boiling point and there maintained for a period of 5 hours to effect hydrolysis. The yield of precipitated $TiO_2$ at the end of such period was 95.2%. The $TiO_2$ was then removed from the mother liquor and thoroughly washed by filtration. The $TiO_2$ was then calcined at a temperature in excess of 900° C. The resultant pigment product was of excellent and improved color, possessed high tinting strength and displayed a clear blue undertone when mixed with dark pigments, such as carbon black.

Example II 8 liters of a titanium sulfate solution of the same analysis as shown in Example I were heated to a temperature of 80° C. immediately before the hydrolysis step. 2 liters of water were heated to 100° C. in a separate vessel equipped with steam coils and an agitator. The titanium solution was added to the water at the following rates of introduction:

| Time | Rate |
|---|---|
|  | L/minutes |
| 0 minute | 1.00 |
| .1 minute | 1.11 |
| .2 minute | 1.23 |
| .3 minute |  |
| .4 minute | 1.56 |
| .6 minute | 2.04 |
| .8 minute | 2.78 |
| 1.0 minute | 4.00 |
| 1.2 minutes | 6.25 |
| 1.4 minutes | 11.30 |
| 1.6 minutes | 25.00 |

Thus, the total time required for the introduction was less than 2 minutes. The temperature of the resultant solution was then slowly raised to the boiling point and there maintained for a period of 5 hours until hydrolysis was complete and a yield of precipitated $TiO_2$ of 96.3% obtained. The $TiO_2$ was then removed from the mother liquor and thoroughly washed by filtration after which it was calcined at a temperature of substantially 950° C. The resultant pigment product was of excellent and improved color, of relatively minute and uniform particle size, and possessed high tinting strength. In addition it displayed a clear blue undertone when mixed with dark pigments.

As will be noted, in this example seeding action was advantageously increased by raising the temperature of the strike water.

Example III 13 liters of a solution of titanium sulfate obtained by attacking ilmenite with sulfuric acid and of the following analysis:

|  | Gram-liters |
|---|---|
| $TiO_2$ | 241 |
| Fe | 86 |
| $H_2SO_4$ (total) | 649 |
| Titanium$^{+++}$ | 1 | were heated to a temperature of 95° C. preceding the hydrolysis step. 4.7 liters of water were likewise heated to a temperature of 95° C. in a separate vessel fitted with steam coils and an agitator. The titanium solution was added to the water at a rate of 850 cc./min. for the first 30 seconds, after which the rate was continually increased so that the remaining liquor was added within 1½ minutes, making 2 minutes the total time required for liquor introduction. The temperature of the resultant solution was then raised to the boiling point and boiling continued for a period of 5 hours. As a result, a yield of precipitated $TiO_2$ of 95.8% was obtained. The precipitated $TiO_2$ was removed from the mother liquor and thoroughly washed by filtration. The purified precipitate was then calcined at a temperature of 950° C. in a rotary calciner, the resultant pigment product being of excellent and improved color, and of relatively small and uniform particle size. On test, it exhibited high tinting strength and possessed a desirable clear blue undertone when mixed with carbon black.

While one type of diluent and particular character of titanium liquor, together with specific volumes and ratios, have been set out in the above examples, the invention is not limited thereto nor to the temperatures or addition rates employed during the specified critical time periods. Thus, it will be found that the fluid volumes and concentrations used will regulate and control the quantity as well as quality of the titanium hydrate seed which is produced. It has been found especially convenient and I therefore preferably employ such quantities and ratios as are adapted to provide a $TiO_2$ nuclei concentration in the solution to be hydrolyzed of from substantially 3 to 4 g./l. While such comprise preferred concentrations, a range of from about 1 to 10 g./l., depending upon the acidity factor of the hydrolyzable solution, may also be used.

Although, preferably, a ratio of at least 1 volume of diluent to each 3 volumes of titanium solution is employed in the invention, other ratios may be used. Thus, the ratio may vary to as high as, say, 6 or 10 volumes of solution to each volume of diluent, and greater or lesser proportions, depending upon the $TiO_2$ concentration of the hydrolyzable liquor, can also be employed, if desired. Also, though certain volumes and ratios of liquor to diluent have been specified as desirably useful during the critical, initial half-minute period of liquor addition, these are likewise variable. In general, I contemplate employing during said initial 30-second period a 5 to 20% volume of liquor, based on the volume of diluent, and effect addition of from, say, about 1 to 10% of the total titanium liquor to be hydrolzed.

Thereafter, without interruption, incorporation of the respective 99 to 90% portion remaining is then had, but within a period of a minute and a half. Said 90 to 99% remaining portion is also incorporated in the diluent quickly, but in such manner that its rate of addition progressively increases. Thus, during the first minute of said final minute and a half period, from about 30 to 40% of said remaining liquor, and preferably about 45% thereof, is incorporated in the diluent; while about 55 to 70%, and preferably about 60%, thereof is added during the final half minute.

Although, preferably, admixture of the titanium liquor and diluent is effected while both are at temperatures ranging from substantially 90 to 100° C., the temperature of each may be substantially dissimilar; or, the temperature of the titanium liquor may be relatively low, and of an order ranging down to, say, about 60° C. As indicated, the seeding action may be desirably speeded up and a substantially continuous change of rate effected by maintaining the diluent or strike water at a relatively higher order of temperature over the titanium liquor, or by increasing such temperature to, say, substantially 100° C. Also, I have found it desirable to maintain the hydrolyzing diluent at a temperature of at least 85° C., and preferably within the range of substantially 90 to 100° C., in order to obtain optimum benefits in the invention.

Although relatively pure, ordinary hot water comprises a preferred type of hydrolyzing diluent, usefully employable in the invention, other types, such as the wash water or liquors which contain relatively low concentrations of titanium and which result from other steps in the titanium oxide producing operation may be used if desired in lieu of such pure water.

Upon adapting the invention to use, it will be found that substantial benefits and economies result and whether used in conjunction with relatively concentrated or dilute titanium solutions. When applied to the latter, the costly concentration step prior to hydrolysis can be advantageously dispensed with. As a result, wide variations in technique will be permissible which, in turn, makes possible the alteration of the physical properties of the pigment as desired. In commercial practice, the $TiO_2$ concentrations are limited to those whose viscosity permits ease of handling, clarification, filtration, etc. In the total absence of iron, or when that element is present in relatively unappreciable quantities, the $TiO_2$ concentration of the liquor may be increased, say, up to and in excess of substantially 300 g./l. If less acid is present, i. e., should a lower factor of acidity exist, it will be found that either the $TiO_2$ or iron may be increased.

Furthermore, resort to my novel method of regulating and controlling the hydrolysis procedure during the critical first few seconds and minutes thereof will not only result in the provision of a highly improved process, but will ultimately afford production of a titanium oxide pigment possessing maximum opacity, excellent, clear and unexpectedly improved white color, neutral tint, improved hiding power and strength, and of controlled, desirably uniform, relatively small particle size.

Thus, it will be found that by effecting the initial 30-second addition of the liquor in a uniform manner, followed by variable subsequent addition but in a progressively increasing fashion and for a total time period not exceeding substantially 2 minutes, as herein contemplated, avoidance will be had of the prolonged, time-consuming addition rates heretofore considered essential. Accordingly, there will be obviated the necessity of exercising the exceedingly careful control which such prior addition rates have required. That that is important and advantageous becomes obvious from a contrast of such prior methods with the present. Thus, in said prior procedures the hydrolysis reaction is accelerated by relatively slowly and continuously adding the titanium solution to the diluent, whereby colloidally dispersed nuclei are formed. Such addition usually consumes a period of time ranging from substantially 15 to 20 minutes. In these slow strike procedures the $TiO_2$ concentration necessarily slowly increases and over a relatively considerable time period. This is advantageous because during this period and prior to the time the solution has attained a desired $TiO_2$ concentration for hydrolysis, incipient hydrolysis takes place and at an undesirably low $TiO_2$ concentration. Consequently, appreciable quantities of titania are caused to be deposited upon active centers, these initial deposits containing relatively large amounts of impurities which function to deleteriously affect the color which the ultimate pigment will exhibit. Again, formation and dispersion of titanium hydrate to colloidal dimensions serves two distinct purposes: (1) the acceleration of the chemical reaction by exposing large areas of catalytically active surfaces, and (2) the control of particle size. The catalytical activity of a given weight of hydrate is dependent upon the degree of subdivision and the physical characteristics of the surface. Dispersability and surface characteristics are altered by the composition and temperature of the surrounding media and by the rate of addition of reactants. The greater the number of nuclei, the smaller will be the radius of the individual particles after hydrolysis is complete. Since each dispersed unit of colloidal hydrate acts as a center around and upon which hydrolysis takes place, it is important, to insure uniformity throughout the large number of nuclei, that the particles of hydrate be precipitated substantially concurrently. In this manner, the surface characteristics of all particles will be substantially identical and the subsequent growth of additional layers of hydrate by hydrolysis will occur at equal rates, resulting in the beneficial effect of a more uniform particle size pigment. Obviously, in prior processes wherein precipitation occurs over an extended period, it is not possible to attain this desired uniformity in hydrate characteristics. Thus, hydrolysis takes place upon the initial, partially dispersed nuclei, making it difficult to obtain further sub-division later on, e. g., precipitation occurs over an extended period and before the solution becomes sufficiently acid to effect desired complete and relatively concurrent dispersion of all titanium hydrate. Cementation is always imminent, therefore, and variation in the properties of the nuclei consequently results, due to the fact that that portion of the hydrate which precipitates early in the process ages for a longer period before dispersing than the later precipitated nuclei which disperse substantially immediately on precipitation.

In the instant rapid strike process, avoidance of these difficulties is effectively had. Relatively high $TiO_2$ concentrations are arrived at quickly and at a desirably early stage in the hydrolysis. As a result, striking at relatively low concentrations is advantageously prevented. The time required to reach these desirably high concentrations is substantially negligible. Therefore, hydrate precipitation occurs substantially simultaneously and under such conditions and concentrations as are most conducive and beneficial to good color in the final pigment product. Accordingly, the hydrolysis reaction will be so controlled as to be performed at the peak concentration, thereby preventing the deposition at low concentrations of initial hydrate deposits which would contain objectionable pigment color-affecting impurities such as chromium, vanadium, ferric iron, etc.

As indicated above, white titanium oxide pigments, in addition to other requisite properties, must be of relatively pure neutral tint and of satisfactory, uniform particle size. When compounded with dark substances such as rubber, a blue undertone should show up. Since the number and size of pigment particles is determined in a large measure by the number and character of nuclei employed to accelerate the hydrolysis reaction, it will be evident that my process not only affords control over nucleation but of the particle size of the ultimate pigment product as well. Uniformity of particle size is assured and inherently results in my process, due to the fact that the hydrate particles are precipitated at substantially the same moment, the surface characteristics of each are therefore substantially identical and the subsequent growth of additional layers of hydrate must necessarily occur at substantially equal rates.

The improved character of $TiO_2$ pigments produced in accordance with my invention will be evident from its high color value or apparent brightness and tint, particularly when measured in accordance with well-known color determination methods, as described by J. E. Booge and H. E. Eastlack in the Paint, Oil and Chemical Review of April 9, 1924. When measured in accordance with such tests, it will be found that my pigment ranges in excess of a value of 15 (12 being a commercially useful product) and to as high as 18. Similarly, my pigment will possess desirably improved tinting strength (the effectiveness of the pigment to cover up the tint of a colored pigment mixed with it). Thus, when determining such tinting strength in accordance with well-known methods, particularly those described by J. E. Booge and H. E. Eastlack in the Paint, Oil and Chemical Review of April 16, 1924, it will be found that the strength of my improved pigments ranged from 10–15% above those exhibited by prior $TiO_2$ pigments. My improved pigments will also exhibit from 5 to 15% higher hiding power values (determined by the well type cryptometer test described by A. H. Pfund, Journal Franklin Institute, November 1919, p. 676, and in Gardner's Physical and Chemical Examination of Paints, Varnishes, Lacquers and Colors, 1933 Edition, pp. 18–21 and 38–39) when compared with said prior art $TiO_2$ pigments.

In the accompanying Fig. 1 of the drawing there is graphically illustrated the novel results which I attain in my invention, as contrasted to those attained from a following of prior art procedures upon treatment of the same type of titanium sulfate solution. In said drawing the concentration of the $TiO_2$ is plotted against the hydrolysis time. The curve ACB comprises that resulting from a nucleating procedure in accordance with such prior art processes, wherein a slow, constant rate of titanium liquor addition to diluent is effected; whereas the curve ACD comprises that resulting from following my rapid but variable rate of addition procedure. The curve in dotted lines comprises a theoretical procedure. As will be evident, the curve ACD substantially parallels the theoretical curve, a $TiO_2$ concentration in excess of 185 g./l. being reached in my process within substantially 2 minutes' time, whereas the prior art curve ACB demonstrates that to attain the same $TiO_2$ concentration, a time period of 16 minutes is required.

The rate of introduction of liquor to give a desired gm./L. vs. time curve in accordance with my invention can be readily calculated by the formulas derived below. Thus, to achieve such straight line gms./L. vs. time relation, the addition rate must be continually increased. The general expression for the rate at any time, $t$, after the start of introduction is:

$$r = \frac{V_D aC}{(C - at - b)^2}$$

where:

$r$ is the rate of addition as volumes per minute;
$V_D$ is volume of diluent;
$a$ is the concentration gradient as gm./L. per minute;
$C$ is the concentration of constituent in gms./L. of liquor to be introduced;
$b$ is a constant.

When, as in Example II above, there is no change in gradient, i. e., if the gms./L. vs. time curve is a straight line passing through the origin, the constant, $b$, is zero. In such instance the rate is given by the simple relation, $$r = \frac{V_D aC}{(C - at)^2}$$

Where, however, as in Example I, there is a break in the concentration gradient, the rates calculated for the second gradient must take the constant $b$ into account, and a new value of the gradient, $a$, substituted in the equation. From the start of the process up to the time when the gradient is changed the rate of addition is, as before, $$r = \frac{V_D a_1 C}{(C - a_1 t)^2}$$

thereafter, up to the time the solution is exhausted the rate will be $$r = \frac{V_D a_2 C}{(C - a_2 t - b)^2}$$

where, $$a_2 = \frac{K_2 - K_1 a_1}{T - K_1}$$

and $$b = K_1(a_1 - a_2)$$

with $a_1$ = initial gradient;
$K_1$ = time interval for initial gradient;
$T$ = total time for introduction;
$K_2$ = peak concentration in hydrotank at completion of strike.

I claim as my invention:

1. A process for nucleating and hydrolyzing titanium salt solutions to obtain a hydrolysate which on calcination yields a $TiO_2$ pigment of uniformly small particle size, improved hiding power, tinting strength and color, comprising mixing from about 1 to 10% of the total amount of a hot titanium salt solution to be hydrolyzed with a diluent maintained at a temperature ranging from substantially 90 to 100° C., the volume of which is smaller than that of said titanium solution initially and for a period of about 30 seconds effecting admixture of said 1 to 10% volume of titanium solution at a relatively rapid, constant rate, thereafter, without any interruption in the mixing operation adding the remaining portion of said titanium salt solution to said diluent but at a continually progressively increasing rate until on expiration of substantially 2 minutes' time from commencement of the initial liquor and diluent combination, complete admixture of said liquor and diluent becomes effected, and thereafter hydrolyzing the resultant nucleated solution.

2. A process for nucleating and hydrolyzing titanium sulfate solutions to obtain a hydrolysate which on calcination yields a $TiO_2$ pigment of uniformly small particle size, improved hiding power, tinting strength and color, comprising mixing from about 2 to 5% of the total volume of a hot titanium sulfate solution to be hydrolyzed with a diluent maintained at a temperature ranging from substantially 90 to 100° C., the volume of which is smaller than that of said titanium sulfate solution initially and for a period of about 30 seconds effecting admixture of said 2 to 5% volume of titanium solution at a relatively rapid, constant rate, thereafter, without any interruption in the mixing operation adding the remaining portion of said titanium sulfate solution to said diluent but at a progressively and continually increasing rate until on expiration of substantially 2 minutes' time from commencement of the initial liquor and diluent combination, complete admixture of said liquor and diluent becomes effected, and thereafter hydrolyzing the resultant nucleated solution.

3. A process for producing hydrolytically precipitated titanium oxide which on calcination yields a $TiO_2$ pigment of uniformly small particle size, improved hiding power, tinting strength and color comprising initially mixing with agitation a 1 to 10% proportion of the total volume of a hot titanium sulfate solution to be hydrolyzed with a known but smaller volume of diluent maintained at a temperature ranging from substantially 90 to 100° C., effecting such initial admixture at a relatively rapid, constant rate and within a period of time not exceeding substantially 30 seconds, thereafter and without any interruption in the mixing operation incorporating the remaining portion of the titanium sulfate solution to be hydrolyzed in said diluent but at a progressively and continually increasing rate until upon expiration of substantially 2 minutes' time from the start of the mixing operation the entire volume of the titanium sulfate solution to be hydrolyzed becomes incorporated in said diluent, and thereafter hydrolyzing the resultant nucleated solution.

4. A process for producing hydrolytically precipitated titanium oxide which on calcination yields a $TiO_2$ pigment of uniformly small particle size, improved hiding power, tinting strength and color comprising mixing with agitation a 3 to 5% proportion of the total volume of a hot titanium sulfate solution to be hydrolyzed with water maintained at a temperature ranging from substantially 90 to 100° C., a volume of which is less than said total volume of titanium sulphate solution, adding said 3 to 5% proportion of titanium sulfate solution to said diluent at a relatively rapid, constant rate and within a time period not exceeding substantially 30 seconds, thereafter and without any interruption in the mixing operation incorporating the remaining portion of said titanium sulfate solution in said hot water but effecting such incorporation at a progressively and continually increasing rate, until upon expiration of not to exceed substantially 2 minutes' time from the start of the mixing operation the entire volume of said titanium sulfate solution becomes incorporated in said water, and thereafter hydrolyzing the resultant nucleated solution.

5. A process for producing hydrolytically precipitated titanium oxide which on calcination yields a $TiO_2$ pigment of uniformly small particle size, improved hiding power, tinting strength and color comprising initially mixing from about 1 to 10% of the total volume of a titanium salt solution to be hydrolyzed with a hot diluent the volume of which is less than the total volume of the titanium salt solution, effecting such admixture at a relatively rapid, uniform rate but within a time period not exceeding substantially 30 seconds, thereafter and without any interruption in the mixing operation incorporating the remaining 90 to 99% proportion of said titanium solution in said diluent but at a progressively and continually increasing rate of admixture until upon expiration of substantially 2 minutes' time from commencement of the mixing operation, the entire volume of said titanium solution becomes incorporated in said diluent, and thence subjecting the resultant nucleated solution to hydrolysis.

6. In a process for nucleating a hydrolyzable titanium sulfate solution, wherein at least 1 volume of a hot diluent is commingled with each 6 volumes of hot titanium sulfate solution within a time period not exceeding substantially 2 minutes, the improvement which comprises initially adding to said diluent at a rapid, constant rate and over a period not exceeding about 30 seconds, from about 1–10% of the total titanium solution to be hydrolyzed, thereupon, without any interruption in the mixing operation, adding to said diluent from about 30–40% of the balance of the titanium solution to be incorporated therein, said latter addition being effected at a quicker, progressively increasing rate and within a period of 1 minute following said 30-second addition, and thereupon adding to said diluent the portion of titanium liquor which remains, said final addition being effected within a period of 30 seconds after the addition of said 30–40% portion of said titanium liquor.

CARL M. OLSON.